United States Patent [19]

Schutz

[11] 4,426,113
[45] Jan. 17, 1984

[54] COVER FOR SEAT OF A COLLAPSIBLE STROLLER

[75] Inventor: Bernard R. Schutz, New York, N.Y.

[73] Assignee: Fine Art Pillow & Specialties Corp., New York, N.Y.

[21] Appl. No.: 296,960

[22] Filed: Aug. 27, 1981

[51] Int. Cl.³ .............................................. A27C 27/00
[52] U.S. Cl. .................................. 297/219; 280/650; 297/441; 297/457
[58] Field of Search .............. 297/218, 219, 441, 457; 280/87.02 W, 657, 658, 647, 648, 649, 650, 643, 644

[56] References Cited

U.S. PATENT DOCUMENTS

| | | | |
|---|---|---|---|
| 1,139,644 | 5/1915 | D'Arcy | 297/218 X |
| 2,836,833 | 6/1958 | Carlson | 297/218 |
| 3,017,220 | 1/1962 | Chernivsky | 297/441 X |
| 3,998,490 | 12/1976 | Lallave | 297/457 X |
| 4,157,839 | 6/1979 | Lahti | 280/650 X |
| 4,165,097 | 8/1979 | Boudreau | 280/650 X |
| 4,232,897 | 11/1980 | Maclaren | 280/657 X |
| 4,294,464 | 10/1981 | Ettridge | 280/650 X |
| 4,295,683 | 10/1981 | Dubbink | 297/457 X |

*Primary Examiner*—William E. Lyddane
*Assistant Examiner*—Peter A. Aschenbrenner
*Attorney, Agent, or Firm*—James & Franklin

[57] ABSTRACT

The stroller seat has forwardly extending sides, each of which is connected to the frame by a linkage which permits adjustment of the seat position. The cover includes a main portion for lining the interior of the seat. A part extends from the main portion, folds over the seat top, and carries a first pair of laterally extending securing parts, adapted to be situated along the exterior of the respective sides. A second pair of securing parts, laterally extending from the main portion, fold over the respective sides and are releasably connected to the first pair of securing parts to encircle the frame adjacent each side to secure the cover without obscuring the position adjusting linkage or interfering with the operation thereof.

5 Claims, 6 Drawing Figures

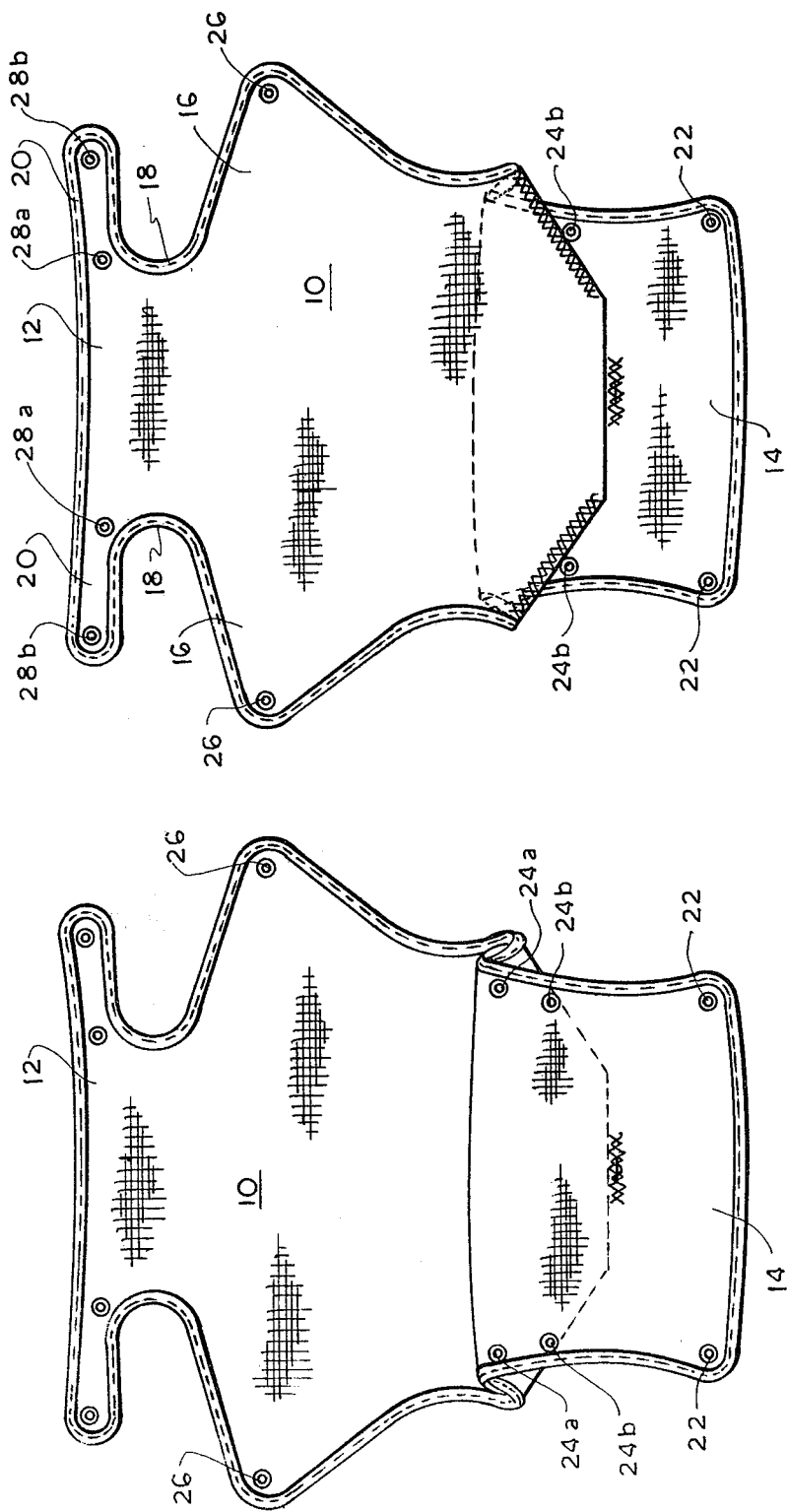

COVER FOR SEAT OF A COLLAPSIBLE STROLLER

The present invention relates to seat covers and, more particularly, to a cover designed for the seat of a collapsible stroller.

Strollers of a variety of different structures have been widely used for many years. Such strollers include a seat upon which an infant or child may be situated. The seat is supported by a frame which is normally a rigid structure composed of lengths of metal tubing or the like.

One type of stroller which has recently become popular is a stroller which can be collapsed to facilitate carrying and storage. Such strollers normally collapse laterally, with the front wheels pivoting upwardly towards the frame parts carrying the handles. The handles are often provided with curved grip portions, similar to that of the handle of an umbrella. When the stroller is collapsed, it appears similar to an umbrella and, thus, this type of stroller is commonly referred to as an "umbrella" stroller. In the umbrella stroller, the seat is made of a non-rigid material, such as canvas or vinyl, to permit folding.

Conventional non-collapsible strollers are sometimes provided with a means for mounting the seat to the frame by a position-adjustable manner. The child can then be seated in an upright position or in a reclining position, or in any number of intermediate positions. Thus, the stroller can function also as a carriage. The child can be transported in the upright position when awake, and the seat can be moved to a more horizontal position to permit the child to nap when necessary. This feature often eliminates the necessity for transporting a separate carriage for the child.

Recently, some collapsible umbrella type strollers have been provided with this position-adjustable seat feature. This is accomplished by furnishing the flexible seat with forwardly extending sides and affixing each of the forwardly extending sides to a rigid support bar having a plurality of recesses therein. Brackets, connected to each side of the frame, receive the connecting bars in a slideable fashion and carry a protrusion adapted to fit within a selected recess in the bar. By sliding the bars relative to the brackets and placing the protrusions in the appropriate bar recesses, the seat may be secured in a number of different positions relative to the frame. Thus, the position of the seat may be easily altered from a substantially upright position to an inclined position, substantially more comfortable for the child when napping.

The vinyl or canvas materials from which the seat is made permit the seat to collapse. However, vinyl is hot and sticky in the summer and cold in winter. Canvas may be rough on delicate skin. Moreover, such materials are not readily cleanable. Thus, removable covers have been designed for use to line the interior of the seat of the stroller. Such covers are made of a soft, flexible material which is comfortable to the touch and acts to cushion the child. In addition, the material is washable such that it may be cleaned when necessary to keep the seat of the stroller smelling and looking clean.

The cover is provided with snaps, tie-strings or other securing devices to hold the cover in position relative to the seat. These devices usually secure the cover to the seat or the frame at the bottom and the top thereof. This presents no problem when the stroller seat is designed to remain stationary relative to the part of the frame from which it is supported. However, in those strollers with the position-adjustable seat feature, the securing devices do not permit adjustment of the seat position relative to the frame without first being disengaged. Moreover, the securing device itself may obscure the linkage which permits adjustment, or prevent the operation thereof, if the effective length of the securing device cannot be altered to accommodate the change in seat position.

Because of this, for strollers with the adjustable seat feature, it was necessary to develop a new way of securing the cover to the seat such that the position of the seat can be adjusted with respect to the frame without requiring the securing means to be released and then re-engaged each time an adjustment in seat position is made. This is difficult because the manner in which the cover is secured must be fashioned in a way which permits movement of the seat relative to the frame without requiring disengagement of the securing means and, at the same time, does not obscure access to or interfere with the operation of the position-adjustable support linkage between the seat and the frame and does not prevent the collapsing of the stroller.

It was also desirable to design the cover for use with strollers having both adjustable and non-adjustable seats, to eliminate the necessity for manufacturing and warehousing separate sets of covers. However, this is difficult because such strollers have different structures requiring covers of different designs.

It is, therefore, a prime object of the present invention to provide a cover for the seat of a collapsible stroller wherein the position of the seat of the stroller can be adjusted relative to the frame without requiring disengagement of the cover.

It is another object of the present invention to provide a cover for a seat of a collapsible stroller, wherein the cover comprises means for securing same to the frame which do not obscure access to the position-adjustable support linkage between the seat and the frame.

It is another object of the present invention to provide a cover for the seat of a collapsible stroller, wherein means for securing the cover to the frame are provided which do not interfere with the operation of the position-adjustable support linkage between the seat and the frame.

It is another object of the present invention to provide a cover for the seat of a collapsible stroller, wherein the means for securing the seat to the frame does not prevent the collapsing of the stroller.

It is another object of the present invention to provide a cover for the seat of a stroller designed to fit strollers with both adjustable and non-adjustable seats.

In accordance with the present invention, a cover for the seat of a collapsible stroller is provided. The stroller has a frame and a means for supporting the forwardly extending sides of the seat to the frame in a position-adjustable fashion, such that the position of the seat can be altered relative to the frame. The cover comprises a main portion for lining the interior of the seat. A part extends from the main portion, is adapted to be folded over the seat top, and has a first laterally extending securing part adapted to be situated along the exterior of the side. A second securing part laterally extends from the main portion, at a point thereon spaced from the first part, and is adapted to fold over the side. Means are provided for releasably connecting the first and second securing parts. The first and second securing parts encircle the frame to secure the cover without obstructing the position-adjustable support linkage or preventing the operation thereof.

To the accomplishment of the above and to such other objects as may hereinafter appear, the present invention relates to a cover for the adjustable seat of a collapsible stroller, as described in the following specification and recited in the annexed claims, taken together with the accompanying drawings, wherein like numerals refer to like parts and in which:

FIG. 2 is a top view of the cover of the present invention;

FIG. 3 is a bottom view of the cover of the present invention;

Figure 1:
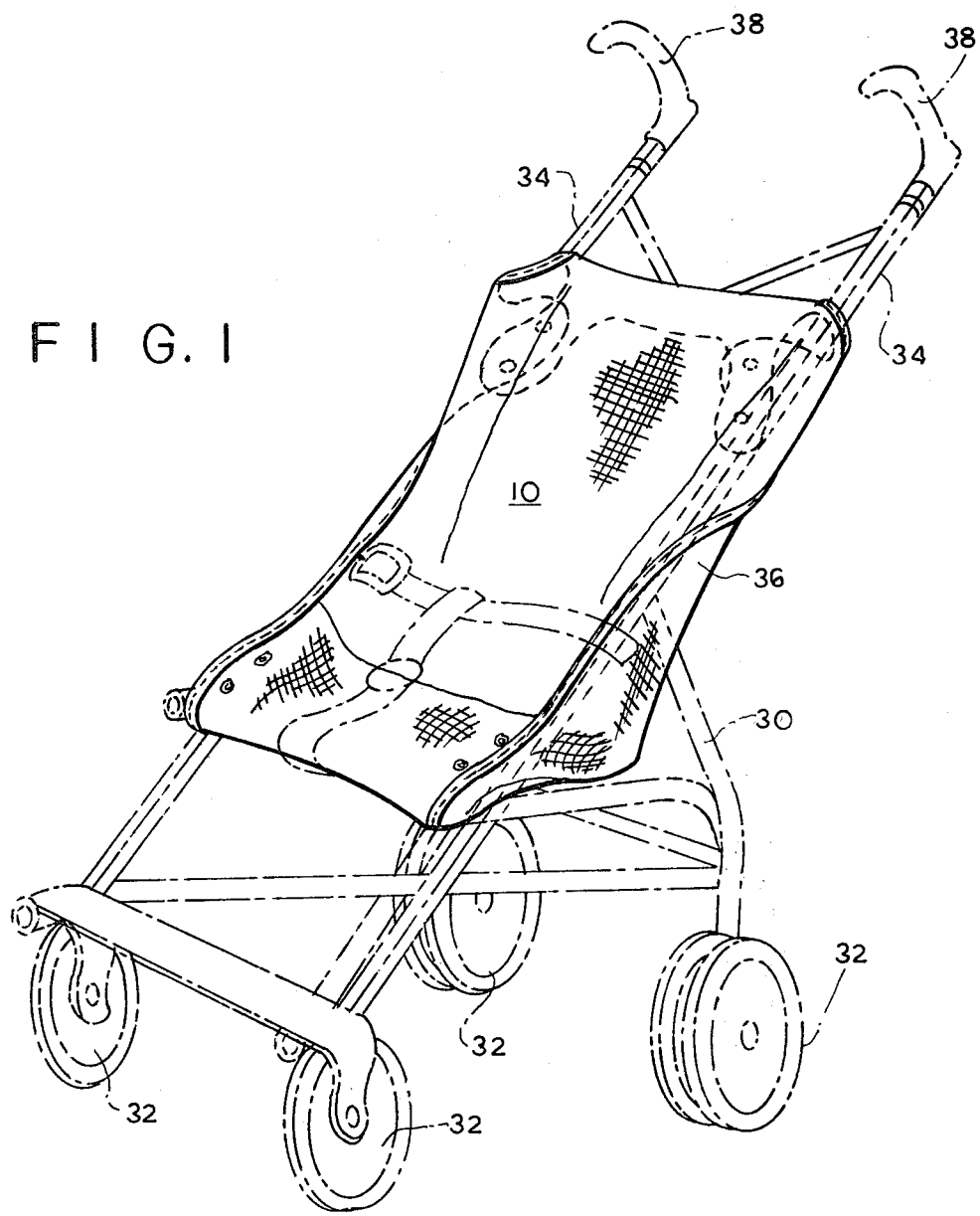
FIG. 1 is an isometric view of the cover of the present invention, showing the cover situated on a collapsible stroller having an adjustable seat.
Figure 4:
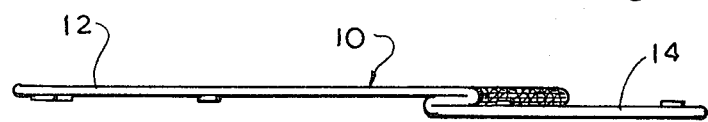
FIG. 4 is a side view of the cover of the present invention.

As seen in FIGS. 2 and 3, the cover of the present invention is made from flexible material, such as canvas, and comprises a main portion 10 which is adapted to be situated on the interior of the seat of a stroller. Main portion 10 has extending therefrom a top part 12. Between part 12 and main portion 10 is a narrow section designed to be approximately as wide as the top edge of the seat back. Part 12 is adapted to fold over the top edge of the seat back and be situated adjacent the exterior surface of the seat back.

Main portion 10 also has a portion 14, designed to be positioned on the horizontal portion of the seat. Portion 14 has a part which is adapted to fold under the forward edge of the seat and be situated adjacent the bottom surface of the seat. Portion 14 is separated from main portion 10 by a tapered fold 11. Fold 11 permits the cover to fit into the corner between the back and horizontal parts of the seat.

Extending laterally, in opposite directions from the sides of main portion 10, are a first pair of securing parts 16, each of which is substantially triangularly shaped. Laterally extending from part 12 and spaced from parts 16, across recesses 18, are a second pair of securing parts 20. Parts 20 are relatively thin and elongated, as compared to parts 16.

Portion 14, at each forward corner, is provided with a snap 22. Spaced from snaps 22, along each side of portion 14, are two sets of snaps 24a, 24b. Snap 22 is designed to engage a selected one of the snaps 24a, 24b (depending upon the structure of the stroller) in order to secure portion 14 to the stroller frame at either side of the horizontal portion of the seat.

Near the tip of each of the securing parts 16 is situated a snap 26. At spaced points along each elongated part 20 are a pair of snaps 28a, 28b. Snaps 26 are designed to engage a selected one of the snaps 28a, 28b (depending upon whether the stroller has a position-adjustable seat or not), in order to secure the part 12 and main portion 10 of the cover.

When the cover is properly positioned on the seat, with top part 12 situated adjacent the back of the seat, securing parts 16 and 20 can be connected by joining the appropriate snaps to form a loop. In the case of a stroller of the type having a non-adjustable seat, snaps 26 engage snaps 28a to form a relatively small loop to encircle frame member 34 and the part of the seat back connected therein. When used on a stroller having a position-adjustable seat, snaps 26 engage snaps 28b to form a larger loop to encircle the forwardly extending side of the seat as well as the frame member and the linkage connecting the side to the frame member.

The structure of each of the securing parts 16 and 20, and the relative positions thereof with respect to main portion 10, permit the cover of the present invention to be used with strollers of the adjustable, as well as the non-adjustable, type. As discussed in detail below, when used with the adjustable type, the loop formed by connecting parts 16 and 20 is located remote from the position-adjustable linkage and is formed so as not to interfere with the adjustment of the seat position.

Figure 6:
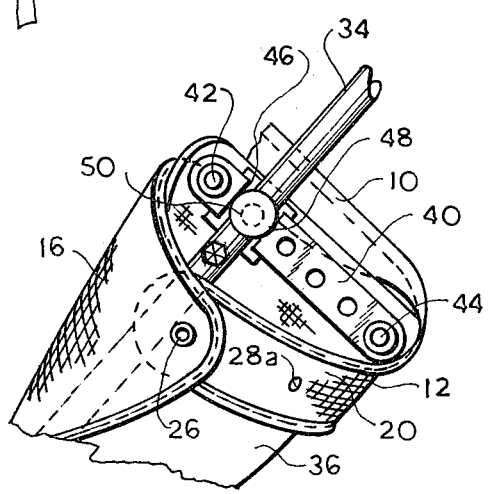

The manner in which the cover of the present invention is mounted on a stroller seat is illustrated in FIGS. 1 and 6, which, respectively, show strollers having adjustable and non-adjustable seats. In each case, the strollers comprise a collapsible tubular metal frame, generally designated 30, which rests on wheels 32. Frame 30 has a pair of tubular frame members 34 which extend from the front wheels 32 along each side of the seat, generally designated 36, and upon the ends of which are situated umbrella-like handle grips 38.

In each case, the main portion 10 of the cover is situated on the interior of the seat to line same. The top part 12 is folded over the top edge of the seat back and is situated adjacent the exterior surface thereof. Similarly, portion 14 is situated adjacent the horizontal portion of the seat with fold 11 in the corner between the back and horizontal portion of the seat. The forward section of portion 14 is folded around the forward edge of the seat, such that it is situated adjacent the exterior surface of the seat bottom. Snaps 22, on either side of portion 14, are then connected to snaps 24 on the corresponding side of the cover, in order to secure portion 14 to the bottom part of the seat. Either snap 24a or 24b is chosen for connection with snap 22, depending upon the structure of the seat.

In strollers with non-adjustable seats, the seats consist of a back part which is connected directly to the frame at either side thereof. In strollers with adjustable seats, forwardly extending sides are provided. The frame is connected to each of the sides. This difference in structure has heretofore required differently designed covers for each stroller type. However, the present invention eliminates this problem.

Figure 5:
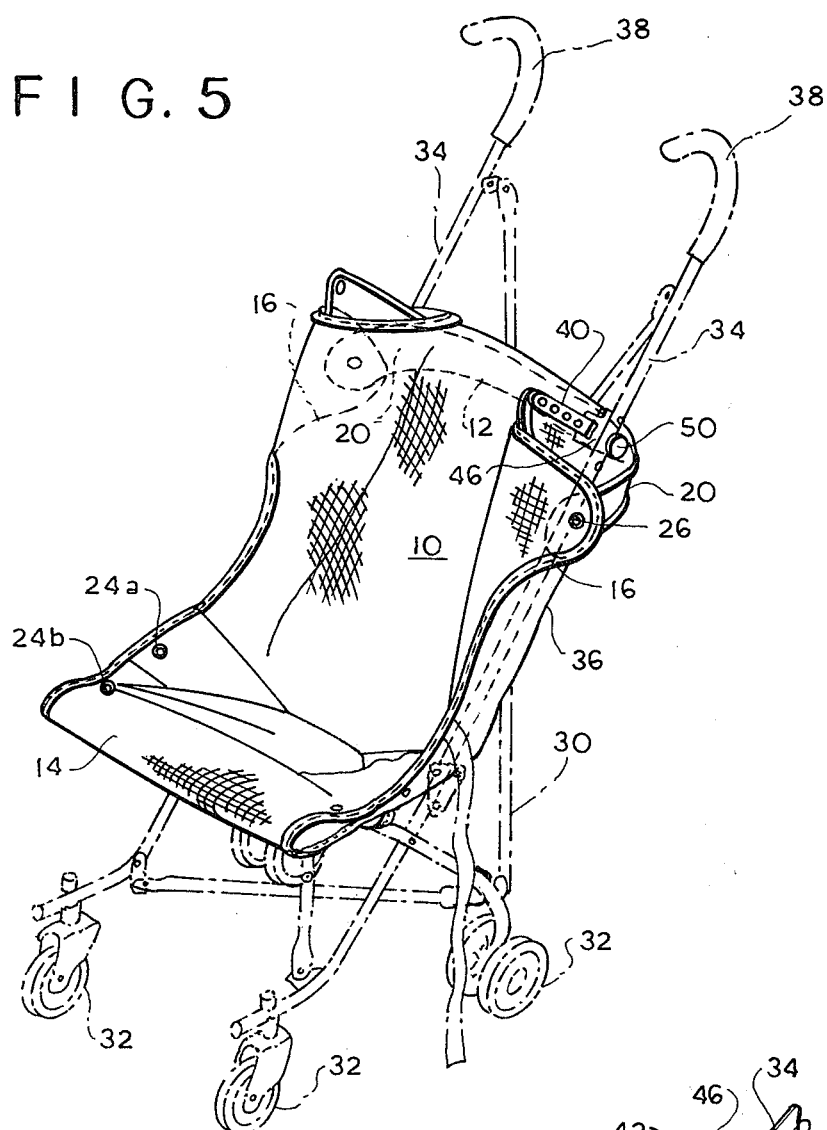
FIG. 5 is a partial view of the position-adjustable linkage of the stroller, illustrating the manner in which the cover of the present invention is secured; and, FIG. 6 is an isometric view of the cover of the present invention, showing same situated on a collapsible stroller with a nonadjustable seat.

As can be seen in FIGS. 1 and 5, in a stroller of the adjustable seat type, the forward extending side 36 of the seat has mounted thereon a connecting bar 40 which is affixed to part 36 at points 42 and 44. A bracket 46 is fixedly mounted on frame member 34. Bar 40 is slideably received within bracket 46. Extending through an opening in bar 40 and bracket 46 is a pin 48 having a head 50. Pin 48 is spring-loaded towards side 36.

Bar 40 is provided with a plurality of recesses 52, spaced along the length thereof. In order to adjust the position of the seat with respect to the frame, the heads 50, on either side of the seat, are moved outwardly and held as bars 40 are moved relative to the respective brackets 46 until the desired recesses 52 align with pins 48. At this point, heads 50 are released such that the spring loading of pins 48 cause same to be received within the selected aligned recesses 52 so as to position sides 36 with respect to the frame.

For a cover to be suitable for use with a stroller having a position-adjustable seat, as illustrated in FIG. 1, the structure of the cover must accommodate the forwardly extending sides 36. Moreover, this must be done in a manner which permits the cover to be secured to the frame without obscuring the position-adjustable linkage consisting of bar 40, bracket 46, pin 48 and head 50, and which permits the position-adjustable linkage to be operated to adjust the position of the seat relative to the frame without interference from the cover.

This is accomplished in part by the triangular shape of securing parts 16 and the elongation of laterally extending securing parts 20 to permit same to be situated along the exterior surface of the forwardly extending side 36, and providing snaps 28b on parts 20 to connect with snaps 26 on laterally extending parts 16 to form a loop. The loop formed by the securing parts 16, 20 is large enough to encircle the entire width of the side 36, including the frame member 34 from which it is supported. Thus, side 36 can be moved relative to frame member 34 without interference from the cover. Access to the position-adjustable linkage is achieved by locating parts 16 along main portion 10, such that the portions thereof adjacent the exterior of sides 36 are situated below the position-adjustable linkages, and by spacing parts 20 along main portion 10 from parts 16, such that the parts 20, when positioned along sides 36, are also situated below the position-adjustable linkage. By structuring and positioning the securing parts 16 and 20 in this manner, the top edges of the securing parts will be located substantially parallel to, but spaced from, bar 40. Thus, frame member 34 and forwardly extending side part 36 are encircled to secure the cover without obscuring the position-adjustable linkage or interfering with the operation thereof.

As illustrated in FIG. 6, the cover of the present invention is also suitable for use with a stroller having a seat which is not position-adjustable. Such a heat has no forwardly extending sides 36, and the back thereof is wrapped around and secured to the frame member 34 at each side thereof. Because of this, snaps 26 on parts 16 are provided for connection with snaps 28a on parts 20, so as to form a relatively small loop to encircle frame members 34.

It will now be appreciated that the present invention relates to a cover designed for use on the seat of a collapsible stroller. The structure of the cover includes portions which encircle the frame. For strollers of the type having an adjustable seat, the cover is designed to accommodate the forwardly extending side of the seat and secure the cover to the frame, without obscuring the linkage provided to adjust the position of the seat or interfering with the operation thereof.

While only a single preferred embodiment of the present invention has been disclosed herein for purposes of illustration, it is obvious that many variations and modifications could be made thereto. It is intended to cover all of these variations and modifications, which fall within the scope of the present invention as defined by the following claims:

I claim:

1. A stroller comprising a frame having first and second generally parallel spaced members; a seat having a generally horizontal part and a generally upstanding part, said upstanding part being situated between said frame members, having a top, an interior surface, and an exterior surface, and comprising spaced side portions; and means for position-adjustably mounting each of said side portions to a different one of said frame members, and a cover for lining said seat, said cover having first and second sides and comprising first and second sections; each of said sections comprising first and second oppositely extending securing parts, said securing parts on each of said sides forming a pair and being spaced from each other, said first section being adapted to be situated adjacent said interior surface of said upstanding part, said second section being adapted to fold over said top of said upstanding part and be situated adjacent the exterior surface thereof, with said securing parts in each of said pairs being substantially aligned; and means for releasably interconnecting said securing parts in each of said aligned pairs to form first and second closed loop structures, each of said structures being adapted to encircle a different one of said frame members, and at least a part of said side portion mounted thereto, to secure the cover to said stroller.

2. The combination of claim 1, wherein each of said loop structures encircles said frame member at a point thereon spaced from said mounting means.

3. The combination of claim 1, wherein said mounting means is adjustable through a given distance and wherein each of said loop structures is larger than said given distance.

4. The combination of claim 1, wherein said interconnecting means comprises means for altering the effective size of said loop structure.

5. The combination of claim 1, wherein said horizontal part has an interior and an exterior surface and wherein said cover further comprises a third section comprising first and second portions adapted to be situated adjacent said interior surface and said exterior surface of said horizontal part, respectively, and means for releasably connecting said first and second portions of said third section.

* * * * *